(12) United States Patent  
Perala et al.

(10) Patent No.: US 9,323,363 B2  
(45) Date of Patent: Apr. 26, 2016

(54) PROVIDING META INFORMATION IN WRIST DEVICE

(71) Applicant: Polar Electro Oy, Kempele (FI)

(72) Inventors: Minna Perala, Oulu (FI); Jukka-Pekka Helisten, Oulu (FI)

(73) Assignee: POLAR ELECTRO OY, Kempele (FI)

( * ) Notice: Subject to any disclaimer, the term of this patent is extended or adjusted under 35 U.S.C. 154(b) by 133 days.

(21) Appl. No.: 13/780,333

(22) Filed: Feb. 28, 2013

(65) Prior Publication Data

US 2014/0240243 A1 Aug. 28, 2014

(51) Int. Cl.
*G06F 3/041* (2006.01)
*G06F 3/0488* (2013.01)

(52) U.S. Cl.
CPC ............. *G06F 3/041* (2013.01); *G06F 3/0488* (2013.01)

(58) Field of Classification Search
CPC . G06F 3/048–3/0482; G06F 3/0487–3/04883; G06F 2203/04808
USPC ........................... 345/173–178; 715/863–864
See application file for complete search history.

(56) References Cited

U.S. PATENT DOCUMENTS

| | | | |
|---|---|---|---|
| 2004/0102931 A1* | 5/2004 | Ellis ..................... | A61B 5/1038 702/188 |
| 2009/0199130 A1* | 8/2009 | Tsern et al. ................... | 715/810 |
| 2010/0198453 A1* | 8/2010 | Dorogusker ....... | A63B 24/0062 701/31.4 |
| 2011/0234521 A1* | 9/2011 | Kim et al. ...................... | 345/173 |
| 2012/0050185 A1* | 3/2012 | Davydov et al. .............. | 345/173 |
| 2013/0254705 A1* | 9/2013 | Mooring et al. .............. | 715/784 |
| 2013/0332886 A1* | 12/2013 | Cranfill et al. ................ | 715/835 |

* cited by examiner

*Primary Examiner* — Liliana Cerullo
(74) *Attorney, Agent, or Firm* — Hoffmann & Baron, LLP

(57) ABSTRACT

A method, apparatus, and computer program for providing meta information in a wrist-worn training computer. The method includes displaying, by the wrist-worn training computer, a first display view comprising at least one display element on a touch-sensitive display screen of the wrist-worn training computer, wherein the display element is associated with a function of the wrist-worn training computer; indicating, by an output of the wrist-worn training computer, availability of meta information associated with the function of the wrist-worn training computer; and displaying, in a second display view by the wrist-worn training computer, the meta information on the touch-sensitive display screen upon detection of a sweep touch input from the user through a touch-sensitive part of the touch-sensitive display screen.

22 Claims, 5 Drawing Sheets

PROVIDING META INFORMATION IN WRIST DEVICE

BACKGROUND

1. Field

The invention relates to the field of training computers used in connection with physical exercises and, particularly, to wrist devices comprising a touch-sensitive display screen.

2. Description of the Related Art

Touch-sensitive display screens are provided in portable electronic devices such as mobile phones and tablet computers. An advantage in the touch-sensitive display screen is an intuitive user interface.

SUMMARY

According to an aspect of the present invention, there is provided a method comprising: displaying, by a wrist-worn training computer, a first display view comprising at least one display element on a touch-sensitive display screen of the wrist-worn training computer, wherein the display element is associated with a function of the wrist-worn training computer; indicating, by an output of the wrist-worn training computer, availability of meta information associated with the function of the wrist-worn training computer; and displaying, in a second display view by the wrist-worn training computer, the meta information on the touch-sensitive display screen upon detection of a sweep touch input from the user through a touch-sensitive part of the touch-sensitive display screen.

According to another aspect of the present invention, there is provided an apparatus comprising a wrist-worn training computer. The wrist-worn training computer comprises a touch-sensitive display screen, at least one processor, at least one memory including a computer program code. The at least one memory and the computer program code are configured, with the at least one processor, to cause the wrist-worn training computer to: display a first display view comprising at least one display element on the touch-sensitive display screen, wherein the display element is associated with a function of the wrist-worn training computer; indicate, by an output of the wrist-worn training computer, availability of meta information associated with the function of the wrist-worn training computer; and display, in a second display view, the meta information on the touch-sensitive display screen upon detection of a sweep touch input from the user through a touch-sensitive part of the touch-sensitive display screen.

According to yet another aspect of the present invention, there is provided a computer program product embodied on a non-transitory distribution medium readable by a computer and comprising program instructions which, when loaded into a computer, cause the computer to execute a computer process comprising: displaying a first display view comprising at least one display element on a touch-sensitive display screen of a wrist-worn training computer, wherein the display element is associated with a function of the wrist-worn training computer; indicating, by using an output of the wrist-worn training computer, availability of meta information associated with the function of the wrist-worn training computer; and displaying, in a second display view of the wrist-worn training computer, the meta information on the touch-sensitive display screen upon detection of a sweep touch input from the user through a touch-sensitive part of the touch-sensitive display screen.

Embodiments of the invention are defined in the dependent claims.

BRIEF DESCRIPTION OF THE DRAWINGS

Embodiments of the present invention are described below, by way of example only, with reference to the accompanying drawings, in which.

DETAILED DESCRIPTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
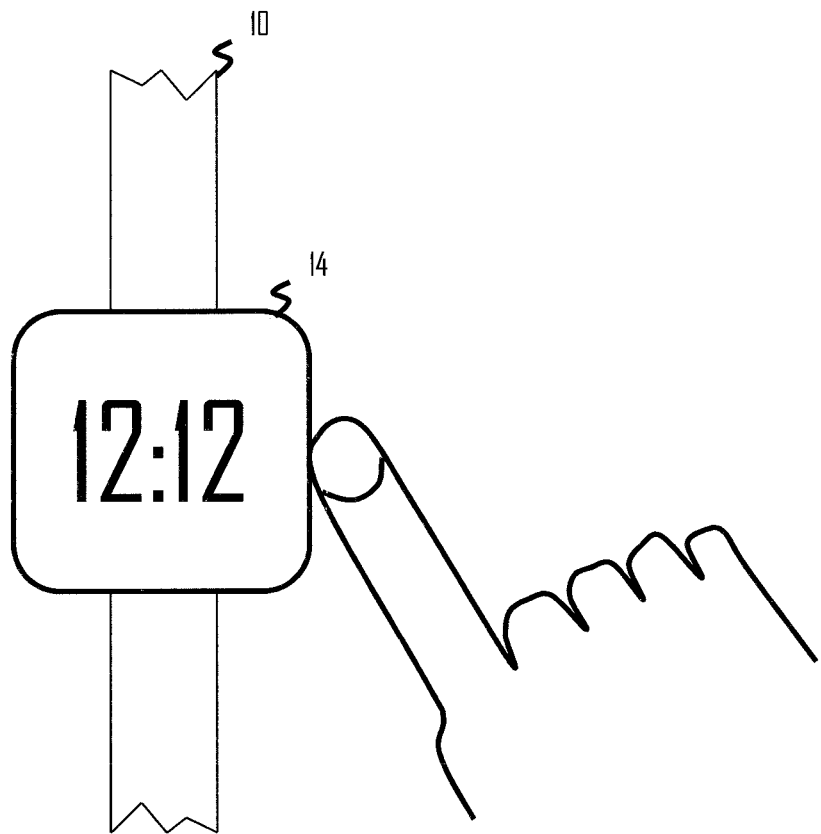
FIG. 1 illustrates a wrist-worn training computer according to an embodiment of the invention.

FIG. 1 illustrates an apparatus according to an embodiment of the invention. The apparatus illustrated in FIG. 1 is a wrist-worn device and, in an embodiment, a wrist-worn training computer. The training computer refers to sports or physical activities, wherein the wrist-worn training computer is used as a user interface device configured to interact with a user during a physical exercise, e.g. running, cycling, swimming, etc. The wrist-worn training computer may connect to at least one sensor configured to carry out measurements during the exercise. The at least one sensor may comprise a heart activity sensor, a motion sensor, a cycling sensor, a positioning device, etc. The at least one sensor may be comprised in the wrist-worn training computer or it may be provided in a different casing. The at least one sensor may be comprised in a training apparatus the user is operating during the exercise, e.g. a gym apparatus such as a treadmill, a stationary bicycle, or a rowing machine. The wrist-worn training computer may receive measurement data from the at least one sensor, process the data, and display at least some of the processed data through a user interface of the training computer. The wrist-worn training computer may display the user's heart rate, traveled distance, energy consumption, etc.

The wrist-worn training computer may comprise a display screen 14 and a strap 10 designed to be placed around a wrist of a user of the training computer. The strap 10 may comprise a buckle or another fastening mechanism by which the fastening around the wrist is ensured. The display screen 14 may be a touch-sensitive display screen configured to display content under the control of a processor and to sense user inputs through a touch-sensitive part of the display screen 14. The touch-sensitive part of the display screen 14 may span over substantially the whole display area of the display screen 14. The touch-sensitive part may be realized according to state-of-the-art techniques, e.g. it may be based on resistive or capacitive touch sensing technology. The wrist-worn training computer may additionally comprise at least one other user input mechanism, e.g. one or more buttons provided at the edges of a casing comprising the display screen 14. Physical dimensions of the display screen may be such that a diameter of a display area of the display screen is below two inches and the display area may be below four square inches. The shape of the display screen 14 may be round, rectangular, hexagonal, or octagonal, for example.

The user may thus operate the wrist-worn training computer by pointing the touch-sensitive display screen 14 with his/her finger. The inputs supported by the training computer and provided by the user through the touch-sensitive part of the display screen 14 may comprise taps in which the user's finger is in touch with a certain section of the touch-sensitive part for a brief interval, and the finger is substantially static during the contact with the touch screen 14. This type of input may be used for selecting a display element currently displayed on the display screen. Another embodiment of selecting the display element is a double tap in which the user taps the same section at least twice. Another input may comprise a sweep input in which the user's finger is detected in contact with different sections of the touch-sensitive part sequentially, i.e. the user sweeps his/her finger on the display screen 14. The sweeping motion may be linear, e.g. it may be directed from one edge of the display screen 14 towards an opposite edge of the display screen 14. The wrist-worn training computer may comprise a processor, a memory, and a computer program code connected to the touch-sensitive part of the display screen 14 and configured to detect at least the sweep input from signals received from the touch-sensitive part and to determine an appropriate response to the detected sweep input.

Figure 2:
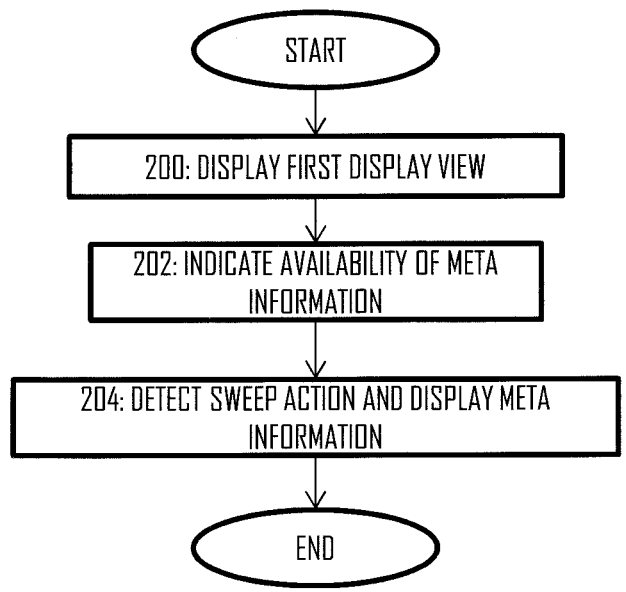
FIG. 2 is a flow diagram of a process for controlling display screen of the wrist-worn training computer according to an embodiment of the invention.

FIG. 2 illustrates a flow diagram of an embodiment for displaying content on the display screen 14 of the wrist-worn training computer according to an embodiment of the invention. Referring to FIG. 2, the process comprises displaying, by the wrist-worn training computer, a first display view comprising at least one display element on the touch-sensitive display screen 14 of the wrist-worn training computer (block 200). The display element is associated with a function of the wrist-worn training computer. The display element may form a subset of display content displayed in the first display view, e.g. it may be a selection component such as a button, icon, or a menu item displayed on the display screen 14. The display element may, however, encompass the whole display view.

In block 202, the process comprises indicating, by an output provided by the training computer, availability of meta information associated with the function of the wrist-worn training computer. In block 204, the process comprises displaying, in a second display view by the wrist-worn training computer, the meta information on the touch-sensitive display screen 14 upon detection of a sweep touch input from the user through the touch-sensitive part of the touch-sensitive display screen.

This embodiment may provide, in the first display view displayed on the display screen 14, first display content and the display element that indicates the availability of more information on the displayed first display content. The second display view displayed on the display screen 14 then provides the additional information. In this manner, the embodiment provides an intuitive way of effectively employing the small display area of the wrist computer to display more information.

In an embodiment, the detection of the sweep touch input in connection with the first display view causes the processor to display the second display view comprising a manual of the training computer or at least a subset of the manual. The subset of the manual may be determined on the basis of the contents of the first display view.

In an embodiment, the second display view comprises none of the display elements displayed in the first display view.

Figure 3:
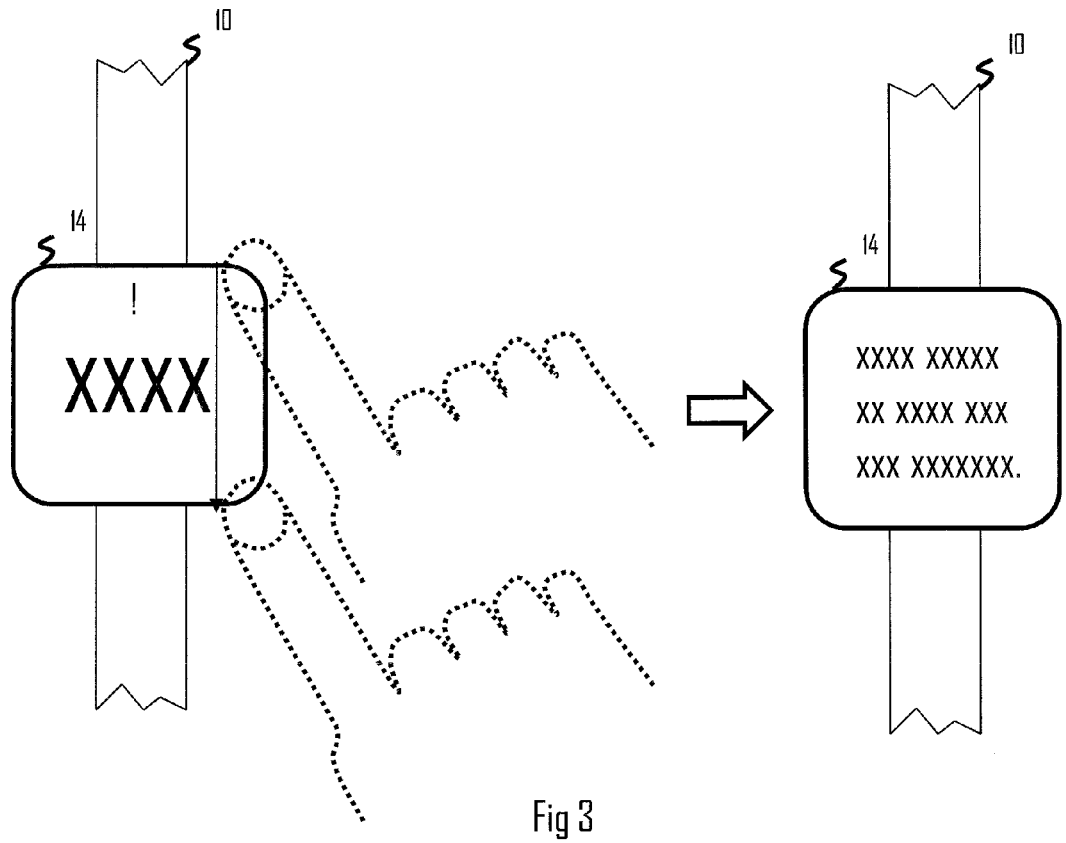
FIG. 3 illustrates switching from a first display view to a second display view in response to a sweep touch input in the wrist-worn training computer according to an embodiment of the invention.

FIG. 3 illustrates this embodiment. On the left hand side, the first display view is illustrated. The first display view may comprise display content represented by "XXXX" and the above-described display element indicating the presence of the meta information. The display element may comprise an icon displayed in the first display view. The icon may be arranged to vary depending on the type of the meta information. In this example, the display element is an exclamation point (!). Upon detecting the sweep touch input, the processor of the training computer is configured to switch the first display view into the second display view illustrated on the right hand side of FIG. 3.

In an embodiment, the switch from the first display view to the second display view is triggered by detection of a sweep touch input starting from a first edge of the touch-sensitive part of the display screen 14 and ending at a second edge, opposite to the first edge, of the display screen 14. The sweep touch input may start from outside the first edge of the display screen.

In an embodiment, the switch from the first display view to the second display view is triggered by detection of the sweep touch input starting from an upper edge of the touch-sensitive part of the display screen 14 and ending at a lower edge of the display screen 14, and wherein the upper edge and lower edge are determined from the viewpoint of the user looking at the display screen 14. The direction of the sweep motion may thus be in parallel with a longitudinal axis of the strap 10 and/or parallel to up-down direction of text displayed on the display screen 14.

In an embodiment, the user needs to start the sweep gesture outside the first edge of the display screen 14 and end it outside the opposite edge of the display screen 14 in order to ensure that the training computer detects the input. The training computer may be configured to detect the sweep touch input when it detects the touch on the first edge of the touch-sensitive part and a continuous sweep touch throughout the touch-sensitive part to the opposite edge of the touch-sensitive part.

In an embodiment, the second display view comprises exclusively informative content. The second display view may comprise exclusively textual or graphical (e.g. an image or animation) information and, in response to the detection of the sweep touch input, the processor may be configured to retrieve a text file from the memory and display the textual contents of the text file in the second display view. The processor may determine the text file to be retrieved on the basis of the contents of the first display view, as described in greater detail below.

Figure 4:
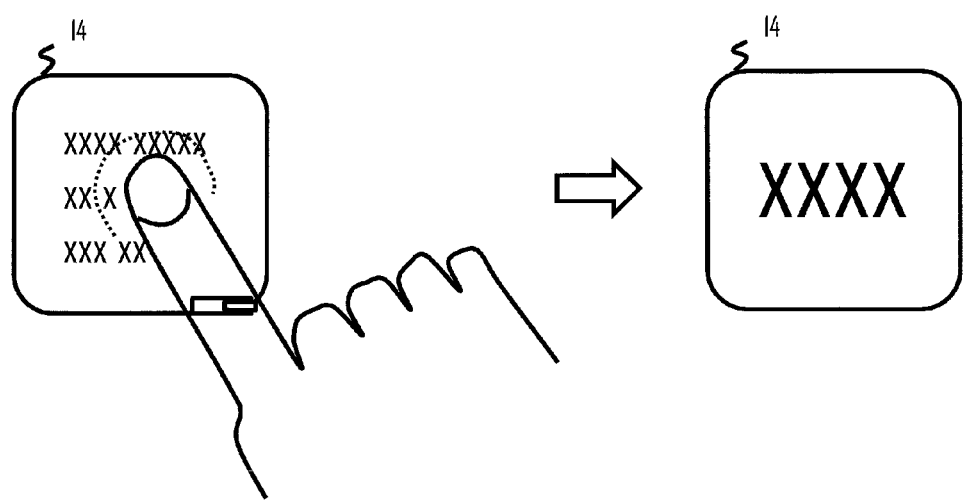
FIG. 4 illustrates switching from the second display view to the first display view in response to a touch input in the wrist-worn training computer according to an embodiment of the invention.

The second display view may comprise no selection components that the user could select to navigate further or to activate a function of the training computer different from the function handling the operation between the first display view and the second display view. As a consequence, the only function associated with the second display view may be reverting back to the first display view. FIG. 4 illustrates this embodiment where the second display view is illustrated on the left hand side of the Figure. The processor may be configured to revert from the second display view to the first display view (right hand side of FIG. 4) upon detecting a user input on the touch-sensitive part of the display screen 14, e.g. upon receiving a determined signal from the touch-sensitive part. The detected user input may be a tap on the touch-sensitive part or depression of a back button provided on the edge of the casing comprising the display screen 14. The tap may be provided at an arbitrary location on the touch-sensitive part of the display screen 14, i.e. detection of the tap on any section of the touch-sensitive part causes the processor to trigger the return to the first display view. In response to reverting from the second display view to the first display view, the processor may deactivate the display element indicating the presence of the meta information. However, in another embodiment the processor may maintain the display of the display element even when returning from the second display view to the first display view.

In an embodiment, the indication of the availability of the meta information on the first display view is removed after the second display view has been displayed a determined number of times. The determined number may be higher than one. The training computer may then assume that the user has memorized the meta information upon reading it a determined number of times.

In an embodiment, the indication of the availability of the meta information on the first display view is removed after a determined time period has elapsed from a first time the second display view was provided. The time period may be counted when the first display view is being displayed, and the counting may be suspended whenever another display view is displayed. This procedure may be carried out for any one of the display views displayed by the training computer and associated with the meta information.

The output used for indicating the availability of the meta information may comprise at least one of the following: a display element such as a static icon or an animation, a specific background color or texture displayed on the display screen 14, a highlighted display element displayed on the screen (e.g. a cursor), a light activated on the display screen 14 or elsewhere on the training computer, a vibration output by the training computer, and an audio output by the training computer. The indicator may be customizable such that the training computer may provide settings for adjusting the indicator(s) used for indicating the presence of the meta information. The training computer may provide the user with an option to use multiple indicators concurrently, e.g. the audio output and a visual indicator.

Figure 5:
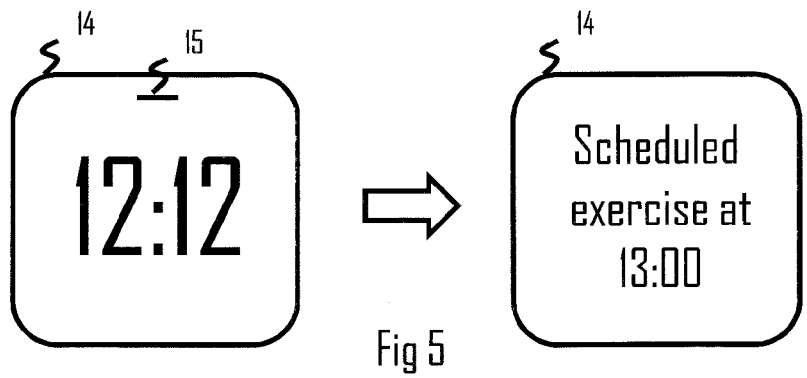
FIGS. 5 to 12 illustrate different associations between the first display view and second display view according to some embodiments of the invention.

Let us now describe some examples of the first display view and associated second display view with reference to FIGS. 5 to 12. Referring to FIG. 5, the first display view is associated with a stand-by state of the training computer. The stand-by state may be defined as a state where the training computer performs no processing and/or display of any exercise-related measurement data. The first display view may comprise a clock display and the display element 15 indicating the presence of the meta information. Upon detecting the sweep touch input in this display view, the processor may be configured to provide the second display view comprising a timing of a next scheduled training event. The memory of the training computer may store a training schedule or calendar for the user, and the meta information may be used to indicate an event stored in the training schedule or the calendar.

Figure 6:
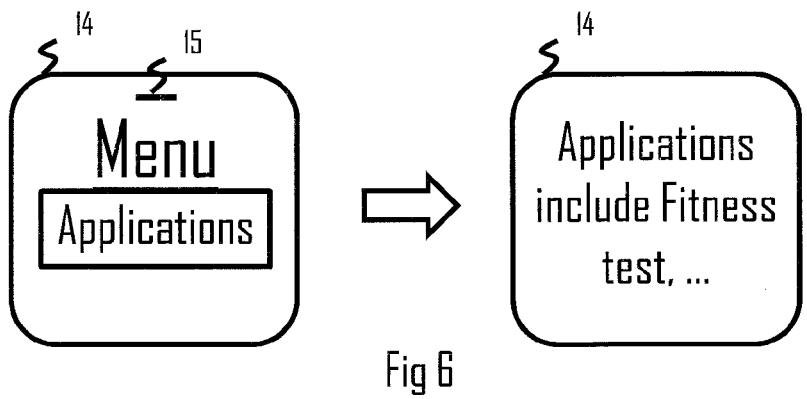
Figure 7:
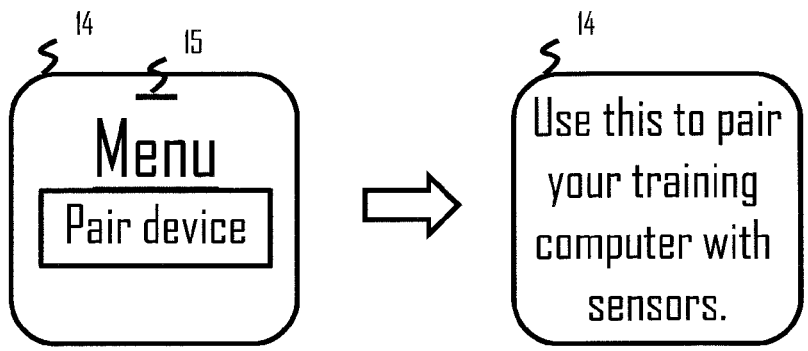
Figure 8:
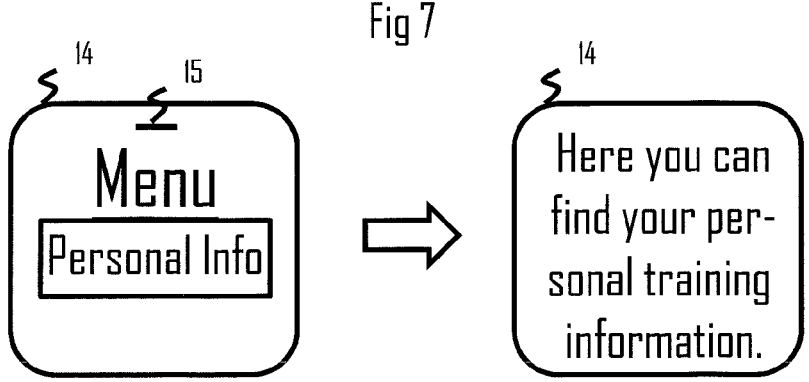
Figure 9:
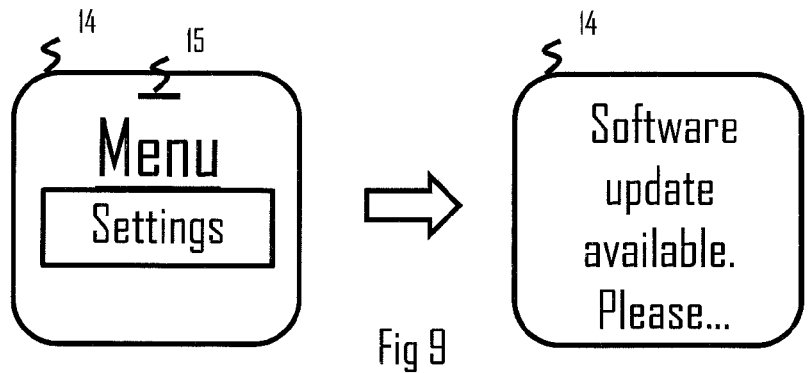
Figure 10:
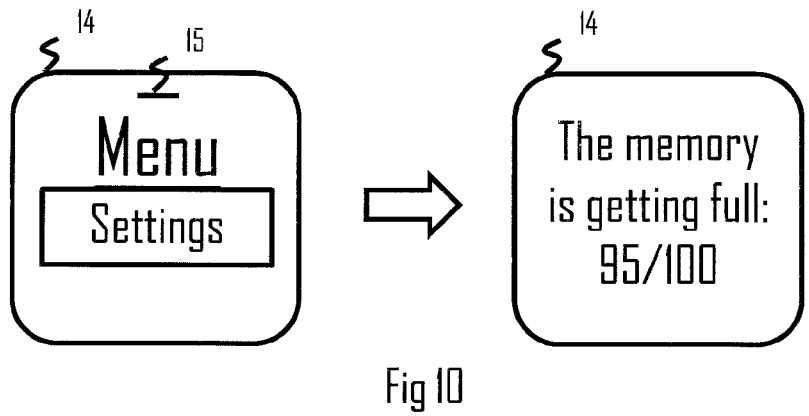

Referring to FIG. 6, the first display view comprises a menu display view, and one of the menu items may be highlighted. The highlighting may be realized by a cursor indicating the menu item (e.g. a box around the menu item as shown in FIG. 6). The highlighting itself may serve as the indicator of the presence of the meta information, and/or another output may be used to indicate the presence of the meta information, e.g. the icon 15. The second display view may be arranged to display information on the highlighted menu item, e.g. textual information on what type of action is triggered by the menu item or what other menu items can be are arranged behind the highlighted menu item when the user selects the highlighted menu item. In the example of FIG. 6 where the highlighted menu item of the first display view is an "Applications" menu item, the meta information may list what type of applications are stored in a menu structure behind the "Applications" item. In the example of FIG. 7, the highlighted menu item of the first display view is "Pair device" which may be a function used to trigger wireless pairing between the training computer and at least one external sensor. The second display view may describe what type of pairing may be carried out when selecting this menu item. In the example of FIG. 8, the highlighted menu item of the first display view concerns personal information of the user(s) of the training computer. The personal information may comprise the user's attributes such as the age, gender, weight, maximum heart rate. It may further comprise the user's training history and/or training schedule etc. The second display view may describe what type of personal information is stored behind this menu item. In the examples of FIGS. 9 and 10, the highlighted menu item of the first display view comprises settings of the training computer. The second display view may then comprise information on the status of the training computer, e.g. battery capacity and/or memory capacity, notification of an availability software/firmware update for the training computer, etc. and/or any instructions related to the maintenance of the training computer.

Figure 11:
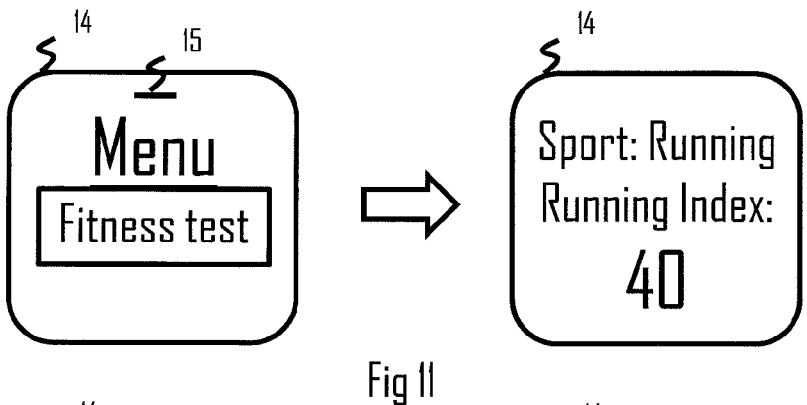

In the example of FIG. 11, the highlighted menu item of the first display view comprises a training application, e.g. a fitness test. The second display view may then describe the user's previous training or performance history, e.g. the result of the previous fitness test, whether or not the user's performance is improving or degrading, etc. The second display view may comprise a value representing the user's performance, and the processor may determine textual contents displayed in connection with the value on the basis of the value. For example, the textual contents may indicate how the user's performance compares with previous training performance and/or with general performance, e.g. whether or not the user's training index is excellent or poor, improving or degrading. The value indicating the performance in connection with the training application may thus determine the text file the processor retrieves for display on the second display view.

Figure 12:
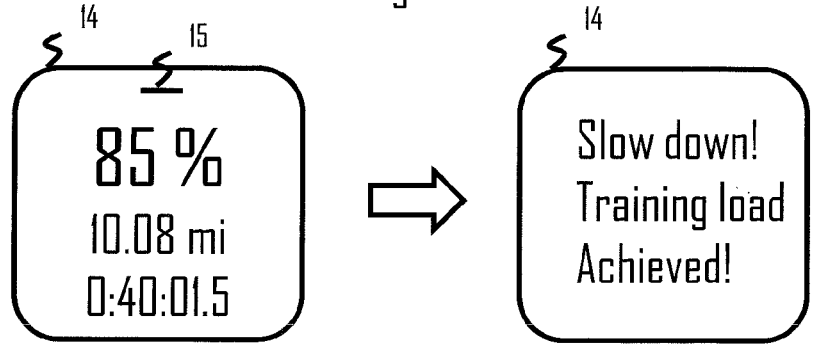

The menu items described above in connection with FIGS. 6 to 11 may be displayed while the training computer is in the stand-by mode and/or in a measurement mode. The measurement mode may be used during physical exercise, wherein the training computer may be connected to at least one sensor carrying out measurements and transferring measurement data related to the physical exercise to the training computer. The training computer may then process the received measurement data and compute at least some performance metrics from the measurement data. The measurement data may comprise heart activity measurement data from which the training computer may derive and display a heart rate of the user, motion measurement data from which the training computer may derive and display a speed or cadence of the user, etc. FIG. 12 illustrates the first display view that may be displayed in the measurement mode of the training computer. The first display view may comprise performance metrics of the user during the physical exercise, e.g. the heart rate, traveled distance, and duration of the exercise so far. The second display view may, in connection with the measurement mode, describe training instructions for the user to carry out during the exercise. The user may have set at least one training target for the physical exercise, and the training computer may be configured to determine on the basis of the acquired measurement data whether or not the user has reached the target. If the user is determined to fall behind from the target(s), the training computer may output instructions for the user as how to reach the target. Such instructions may be provided on the second display view. Accordingly, the processor may be configured to monitor the performance during the exercise and retrieve a text file that corresponds to the current performance with respect to the training target(s) when the user inputs the sweep touch input.

Figure 13:
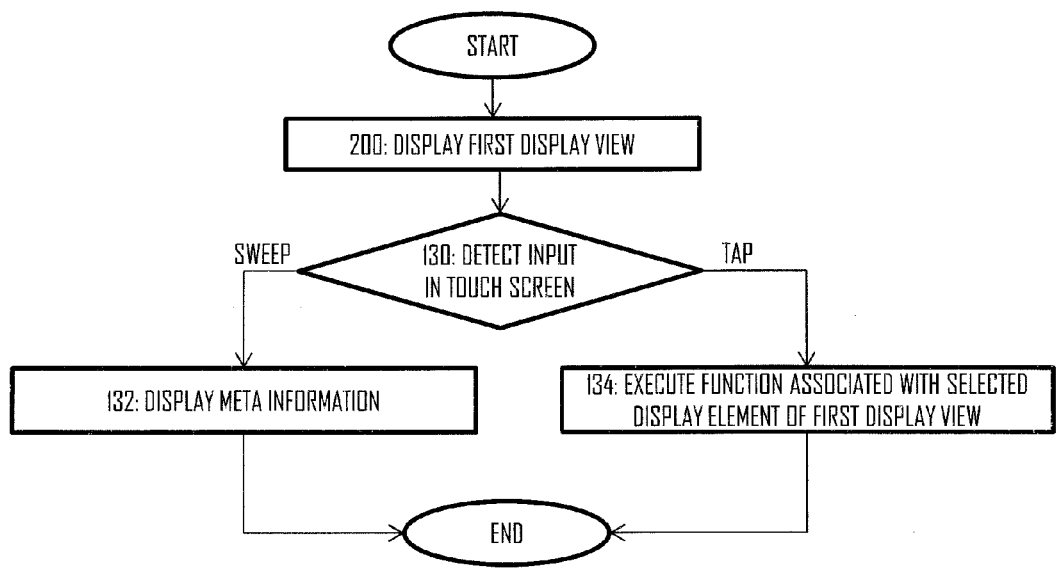
FIG. 13 illustrates a flow diagram of a process for managing dual functionality of a display element according to an embodiment of the invention.

As described above, the second display view may be arranged to provide only the meta information and to return to the first display view, and it cannot be used to navigate further in the menu structure, to change operational mode of the training computer (e.g. from the stand-by mode to the measurement mode), or to launch an application stored in the training computer. However, at least one of the display elements of the first display view may be a selection component that the user may select to execute any one of the above-described functions of the training computer (launch application, change mode, navigate further in the menu tree. The display element(s) may thus be associated with a dual functionality: a first function is the primary function of the display element, e.g. any one of the above-described functions, and a second function is the display of the meta information associated with the display element. FIG. 13 illustrates a flow diagram of a process for determining an action to take in response to the user input detected on the touch-sensitive part of the display screen 14. Referring to FIG. 13, the first display view is displayed in block 200. In block 130, a touch input is detected on the touch-sensitive part of the display screen 14. Block 130 may also comprise determining the type of the touch input. If the touch input is a sweep touch input, the process proceeds to block 132 in which the processor causes the display of the second display view. The processor may also determine the contents of the second display view on the basis of the contents of the first display view and/or on the basis of a subset of contents to be displayed on the second display view. If the touch input is determined to be a tap touch input or another selection input selecting one of the display elements of the first display view, the process proceeds to block 134 in which the processor executes a function associated with the user-selected display element displayed on the first display view, e.g. launch of an application or starting/ending an operation mode of the training computer.

Figure 14:
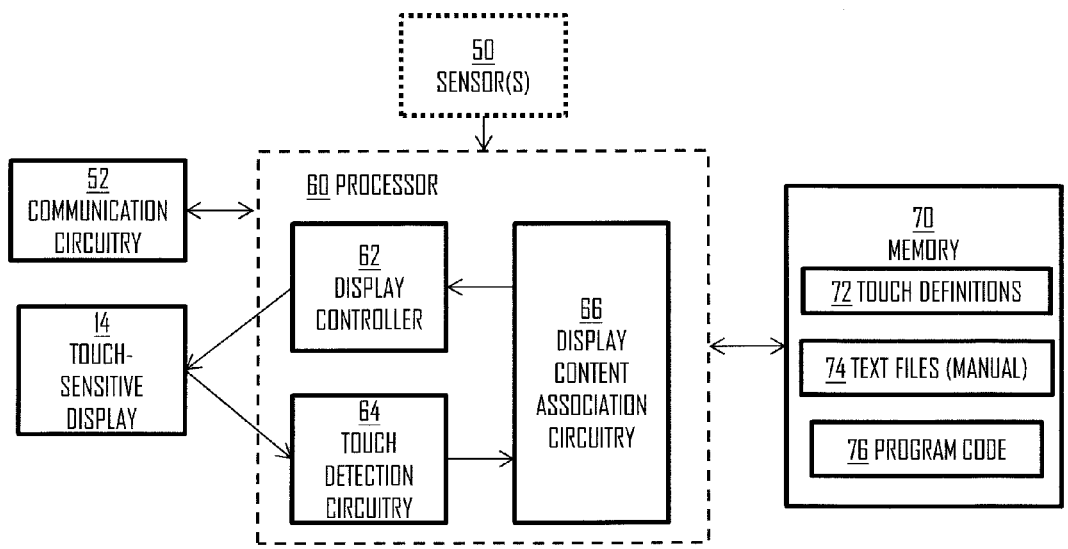
FIG. 14 illustrates a block diagram of an apparatus according to an embodiment of the invention.

FIG. 14 illustrates a block diagram of a structure of an apparatus according to an embodiment of the invention The apparatus comprises at least one processor 60 and at least one memory 70 including a computer program code 76, wherein the at least one memory 70 and the computer program code 76 are configured, with the at least one processor 60, to cause the apparatus to carry out the switching between the first display view and the second display view according to any one of the above-described embodiments. The apparatus may be comprised in the wrist-worn training computer described above.

The apparatus may comprise a wireless communication circuitry 52 configured to establish a wireless connection with at least one sensor device and/or with a computer. The wireless connection may comprise a radio connection and/or an induction-based connection. The wireless connection supported by the communication circuitry 52 may comprise at least one of the following: Bluetooth®, Bluetooth Low Energy, W.I.N.D, a connection based on IEEE 802.15 specifications, ZigBee, and ANT by Dynastream®. The apparatus may, additionally or alternatively, comprise at least one internal sensor 50. The sensor(s) 50 may comprise a motion sensor and/or a heart activity sensor.

The apparatus may further comprise the above-described touch-sensitive display screen 14 operating as an input/output device configured to display information to the user and to sense haptic inputs by the user, e.g. touch-based inputs.

The processor 60 may comprise as sub-circuitries a display controller 62 configured to control the display content displayed on the display screen 14, a touch detection circuitry 64 coupled to the touch-sensitive part of the display screen and configured to detect any touch inputs from the user, and a display content association circuitry 66 configured to select the display contents to be displayed according to user inputs received through input devices of the apparatus, including the touch-sensitive display screen 14. The sub-circuitries 62 to 66 may be constructed as physically separate circuitries having dedicated components, or they may be realized by different computer program modules using at least partly the same physical circuitries, e.g. processor registers and machine-level instructions.

With respect to the embodiments described above, the display controller 62 may configure the display screen 14 to display the first display view. Meanwhile, the touch detection circuitry 64 may monitor for any signal from the touch-sensitive part of the display screen 14. The memory 70 may store touch definitions 72 enabling the touch detection circuitry 64 to distinguish different types of touch inputs, e.g. the tap and the sweep. When the touch detection circuitry 64 receives a signal from the touch-sensitive part of the display screen 14, it may determine what type of touch input is associated with the signal and output the determined type of the touch input to the display content association circuitry 66. The display content association circuitry 66 may then determine what type of content to display on the basis of the content currently displayed on the display screen 14 and the type of the touch input received from the touch detection circuitry 64. If the display content association circuitry 66 receives a notification of detection of a sweep touch input from the touch detection circuitry 64 while the first display view is displayed on the display screen 14, the display content association circuitry may determine what meta information is associated with the first display view and retrieve a corresponding text file 74 from the memory unit. Upon retrieving the text file, e.g. a subset of the manual, the display content association circuitry 66 may configure the display controller 62 to output the contents of the text file to the display screen 14 in the second display view.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 13 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wrist-worn training computers, as described above. Any development of training computers may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

What is claimed is:

1. A method comprising:
   displaying, by a wrist-worn training computer in a measurement mode in which the wrist-worn training computer receives measurement data from at least one sensor device during a physical exercise performed by a user and computes at least one performance metric from the received measurement data, a first display view comprising a first display element on a touch-sensitive display screen of the wrist-worn training computer, wherein the first display element comprises said at least one performance metric and is associated with a first function and a second function of the wrist-worn training computer;
   indicating, by a second display element in the first display view, availability of meta information related to the physical exercise, the meta information comprising information associated with the first display element and the function of the wrist-worn training computer;
   displaying, as the second function in a second display view by the wrist-worn training computer, the meta information on the touch-sensitive display screen in response to detection of a sweep touch input from the user through a touch-sensitive part of the touch-sensitive display screen; and
   executing an action as the first function upon detection of a selection input from the user directed to the first display element, wherein the action comprises executing an application in the wrist-worn training computer or changing an operative mode of the wrist-worn training computer, the first function being different from the second function, the application being different from displaying the meta information in the second display view, wherein the meta information displayed on the second display view is a subset of a manual of the wrist-worn training computer, wherein contents of the subset displayed on the second display view are selected based on the contents of the first display view, the subset of the manual being a text file that is a portion of the manual.

2. The method of claim 1, wherein the display of the meta information is triggered by detection of the sweep touch input starting from a first edge of the display screen and ending at a second edge, opposite to the first edge, of the display screen.

3. The method of claim 2, wherein the display of the meta information is triggered by detection of the sweep touch input starting from an upper edge of the display screen and ending at a lower edge of the display screen, and wherein the upper edge and lower edge are determined from the viewpoint of a user looking at the display screen.

4. The method of claim 1, further comprising returning to the first display view upon detecting a user input while displaying the second display view.

5. The method of claim 4, wherein the second display view is exclusively informative and the only function associated with the second display view is to return to the first display view.

6. The method of claim 1, further comprising removing said indication of the availability of the meta information after displaying the second display view.

7. The method of claim 1, wherein the second display view is provided without at least one of the first display element and the second display element displayed in the first display view.

8. The method of claim 1, further comprising indicating the availability of the meta information by highlighting a display element displayed in first display view.

9. The method of claim 1, wherein the meta information displayed in the second display view comprises training instructions for the user to carry out during a physical exercise.

10. An apparatus comprising:
    a wrist-worn training computer comprising a touch-sensitive display screen, at least one processor, at least one memory including a computer program code, wherein the at least one memory and the computer program code are configured, with the at least one processor, to cause the wrist-worn training computer to perform operations comprising:
    displaying, by the wrist-worn training computer in a measurement mode in which the wrist-worn training computer receives measurement data from at least one sensor device during a physical exercise performed by a user and computes at least one performance metric from the received measurement data, a first display view comprising a first display element on the touch-sensitive display screen of the wrist-worn training computer, wherein the first display element comprises said at least one performance metric and is associated with a first function and a second function of the wrist-worn training computer;
    indicating, by a second display element in the first display view, availability of meta information related to the physical exercise, the meta information comprising additional information associated with the first display element and the function of the wrist-worn training computer;

displaying, as the second function in a second display view, the meta information on the touch-sensitive display screen in response to detection of a sweep touch input from the user through a touch-sensitive part of the touch-sensitive display screen; and executing an action as the first function upon detection of a selection input from the user and directed to the first display element, wherein the action comprises executing an application in the wrist-worn training computer or changing an operative mode of the wrist-worn training computer, the first function being different from the second function, the application being different from displaying the meta information in the second display view, wherein the meta information displayed on the second display view is a subset of a manual of the wrist-worn training computer, and wherein the at least one memory and the computer program code are configured, with the at least one processor, to cause the wrist-worn training computer to perform operations comprising selecting contents of the subset displayed on the second display view based on the contents of the first display view, the subset of the manual being a text file that is a portion of the manual.

11. The apparatus of claim 10, wherein the at least one memory and the computer program code are configured, with the at least one processor, to cause the wrist-worn training computer to perform operations comprising triggering the display of the meta information upon detection of the sweep touch input starting from a first edge of the display screen and ending at a second edge, opposite to the first edge, of the display screen.

12. The apparatus of claim 11, wherein the at least one memory and the computer program code are configured, with the at least one processor, to cause the wrist-worn training computer to perform operations comprising triggering the display of the meta information upon detection of the sweep touch input starting from an upper edge of the display screen and ending at a lower edge of the display screen, and wherein the upper edge and lower edge are determined from the viewpoint of a user looking at the display screen.

13. The apparatus of claim 10, wherein the at least one memory and the computer program code are configured, with the at least one processor, to cause the wrist-worn training computer to perform operations comprising returning to the first display view upon detecting a user input while displaying the second display view.

14. The apparatus of claim 13, wherein the second display view is exclusively informative and the only function associated with the second display view is to return to the first display view.

15. The apparatus of claim 10, wherein the at least one memory and the computer program code are configured, with the at least one processor, to cause the wrist-worn training computer to perform operations comprising removing said indication of the availability of the meta information after displaying the second display view.

16. The apparatus of claim 10, wherein the at least one memory and the computer program code are configured, with the at least one processor, to cause the wrist-worn training computer to perform operations comprising providing the second display view without at least one of the first display element and the second display element displayed in the first display view.

17. The apparatus of claim 10, wherein the at least one memory and the computer program code are configured, with the at least one processor, to cause the wrist-worn training computer to perform operations comprising indicating the availability of the meta information by highlighting a display element displayed in first display view.

18. The apparatus of claim 10, wherein the meta information displayed in the second display view comprises training instructions for the user to carry out during a physical exercise.

19. A computer program product embodied on a non-transitory distribution medium readable by a computer and comprising program instructions which, when executed by the computer, cause the computer to execute a computer process comprising:

displaying by a wrist-worn training computer in a measurement mode in which the wrist-worn training computer receives measurement data from at least one sensor device during a physical exercise performed by a user and computes at least one performance metric from the received measurement data, a first display view comprising a first display element on a touch-sensitive display screen of the wrist-worn training computer, wherein the first display element comprises said at least one performance metric and is associated with a first function and a second function of the wrist-worn training computer;

indicating, by a second display element in the first display view, availability of meta information related to the physical exercise, the meta information comprising additional information associated with the first display view and the function of the wrist-worn training computer;

displaying, as the second function in a second display view of the wrist-worn training computer, the meta information on the touch-sensitive display screen in response to detection of a sweep touch input from the user through a touch-sensitive part of the touch-sensitive display screen; and executing an action as the first function upon detection of a selection input from the user and directed to the first display element, wherein the action comprises executing an application in the wrist-worn training computer or changing an operative mode of the wrist-worn training computer, the first function being different from the second function, the application being different from displaying the meta information in the second display view, wherein the meta information displayed on the second display view is a subset of a manual of the wrist-worn training computer, wherein contents of the subset displayed on the second display view are selected based on the contents of the first display view, the subset of the manual being a text file that is a portion of the manual.

20. The computer program product of claim 19, wherein the meta information displayed in the second display view comprises training instructions for the user to carry out during a physical exercise.

21. A method comprising:

displaying, by a wrist-worn training computer, a first display view comprising a first display element on a touch-sensitive display screen of the wrist-worn training computer, wherein the first display element is associated with a first function and a second function of the wrist-worn training computer;

indicating, by a second display element in the first display view, availability of meta information related to a physical exercise performed by a user of the wrist-worn training computer, the meta information comprising information associated with the first display element and the function of the wrist-worn training computer;

displaying, as the second function in a second display view by the wrist-worn training computer, the meta information on the touch-sensitive display screen in response to detection of a sweep touch input from the user through a touch-sensitive part of the touch-sensitive display screen;

executing an action as the first function upon detection of a selection input from the user directed to the first display element, wherein the action comprises executing an application in the wrist-worn training computer or changing an operative mode of the wrist-worn training computer, the first function being different from the second function, the application being different from displaying the meta information in the second display view; and removing said indication of the availability of the meta information after the second display view has been displayed a determined number of times, wherein the determined number is higher than one, or after a determined time period has elapsed from a first time the second display view was provided, wherein the meta information displayed on the second display view is a subset of a manual of the wrist-worn training computer, wherein contents of the subset displayed on the second display view are selected based on the contents of the first display view, the subset of the manual being a text file that is a portion of the manual.

22. An apparatus comprising:

a wrist-worn training computer comprising a touch-sensitive display screen, at least one processor, at least one memory including a computer program code, wherein the at least one memory and the computer program code are configured, with the at least one processor, to cause the wrist-worn training computer to perform operations comprising:

displaying, by the wrist-worn training computer, a first display view comprising a first display element on the touch-sensitive display screen of the wrist-worn training computer, wherein the first display element is associated with a first function and a second function of the wrist-worn training computer;

indicating, by a second display element in the first display view, availability of meta information related to a physical exercise performed by a user of the wrist-worn training computer, the meta information comprising additional information associated with the first display element and the function of the wrist-worn training computer;

displaying, as the second function in a second display view, the meta information on the touch-sensitive display screen in response to detection of a sweep touch input from the user through a touch-sensitive part of the touch-sensitive display screen;

executing an action as the first function upon detection of a selection input from the user and directed to the first display element, wherein the action comprises executing an application in the wrist-worn training computer or changing an operative mode of the wrist-worn training computer, the first function being different from the second function, the application being different from displaying the meta information in the second display view; and removing said indication of the availability of the meta information after the second display view has been displayed a determined number of times, wherein the determined number is higher than one, or after a determined time period has elapsed from a first time the second display view was provided, wherein the meta information displayed on the second display view is a subset of a manual of the wrist-worn training computer, and wherein the at least one memory and the computer program code are configured, with the at least one processor, to cause the wrist-worn training computer to perform operations comprising selecting contents of the subset displayed on the second display view based on the contents of the first display view, the subset of the manual being a text file that is a portion of the manual.

* * * * *